July 29, 1969    HIROSHI MIYAWAKI ET AL.    3,458,650
COMPOSITE WINDING FOR TRANSFORMERS
Filed Aug. 23, 1967      2 Sheets-Sheet 1
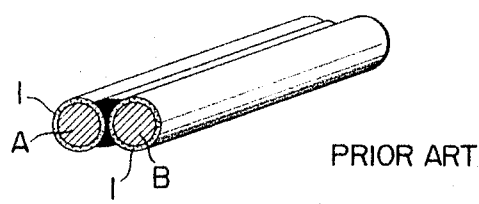
FIG. 1 — PRIOR ART
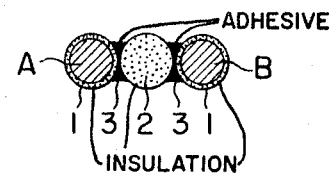
FIG. 2
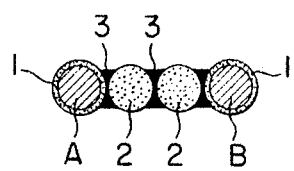
FIG. 3
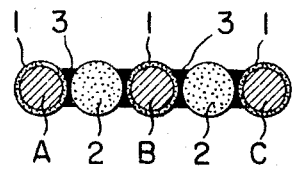
FIG. 4
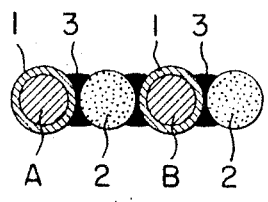
FIG. 5
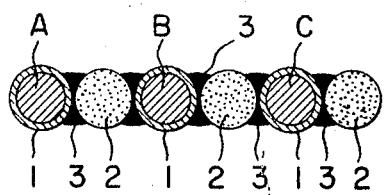
FIG. 6
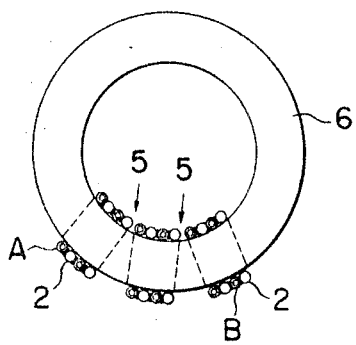
FIG. 7
INVENTORS
HiROSHi MiYAWAKi
KANAZU TANIGUCHI
H. Edward Mestern

INVENTORS
HIROSHI MIYAWAKI
KANAZU TANIGUCHI

*H. Edward Mestern*

United States Patent Office 3,458,650
Patented July 29, 1969

3,458,650
COMPOSITE WINDING FOR TRANSFORMERS
Hiroshi Miyawaki, Kawasaki-shi, and Kanazu Taniguchi, Tokyo-to, Japan, assignors to Toko Kabushiki Kaisha, Tokyo-to, Japan, a joint-stock company of Japan
Filed Aug. 23, 1967, Ser. No. 662,805
Claims priority, application Japan, Aug. 29, 1966 (utility model), 41/81,415; Oct. 1, 1966 (utility model), 41/91,857; Dec. 17, 1966 (utility model), 41/114,876
Int. Cl. H01b 7/30, 11/02
U.S. Cl. 174—117    4 Claims

ABSTRACT OF THE DISCLOSURE

A composite winding consists of an integrally adhesive bonded structure of a plurality of insulated wires and an insulated spacer for maintaining the wires apart. The winding may be used as a transformer winding.

---

This invention relates generally to electrical transformer windings and more particularly to composite windings suitable for use principally in components such as pulse transformers for electronic computers.

In electrical transformers, such as pulse transformers for electronic computers produced recently, use is frequently made of a composite winding formed as an integral structure of primary conductor wire, secondary conductor wire, etc., said wires being in parallel arrangement within a single insulation structure and wound around, for example, a toroidal core.

The principal reasons for using such composite winding is that, by winding the primary conductor wire, secondary conductor wire, etc., in one operation about a toroidal core of a magnetic material, the operation is simplified and made economical through reduction in labor and time and further, by fixing the spacing at a constant value between the individual wires, deviations in the mutual capacitance between the wires are eliminated, and, moreover, the leakage inductances are reduced.

However, in the case of composition winding consisting of two wires, for example, of the type generally known heretofore, since the two conductor wires are in close proximity to each other, the mutual capacitance between the two wires is unfavorably high.

It is an object of the present invention to provide a composite winding, in which the mutual capacitance or capacitances between the individual conductor wires are substantially reduced.

Another object of the invention is to provide a composite winding in which, when each wire composing said winding is in wound state, the mutual capacitances between the individual conductor wires are rendered uniform.

A further object of the invention is to provide a composite winding comprising three or more conductor wires arranged parallelly at equal intervals around a common spacer member, in which composite winding wire in wound state, the mutual capacitances between the conductors are substantially reduced and are uniform, and the leakage inductances are uniform.

Still another object of the invention is to produce a composite winding of the above stated character which is of simple and inexpensive organization and can be produced readily at low cost.

Briefly summarized, the present invention resides in a composite winding for transformers, which comprises at least two insulated conductor wires and one or more spacer members bonded to the insulated conductor wires to form an integral structure and to maintain the conductor wires in mutually parallel and spaced disposition.

The nature, principle, utility, and details of the invention will be more clearly apparent from the following detailed description with respect to preferred embodiments of the invention when read in conjunction with the accompanying drawings, in which like parts are designated by like reference numerals and characters.

In the drawings:

FIG. 1 is an enlarged, fragmentary, perspective view of a composition winding wire of known type;

FIGS. 2, 3, and 4 are enlarged cross-sectional views respectively showing examples of composite winding wires embodying the invention;

FIGS. 5 and 6 are enlarged cross-sectional views respectively showing other examples of composite winding wires according to the invention;

FIGS. 7 and 8 are diagrammatic views, partly in cross section, indicating the wound states of the composite winding wire shown in FIG. 5 as wound around a toroidal core and a cylindrical core, respectively;

Figure 8:
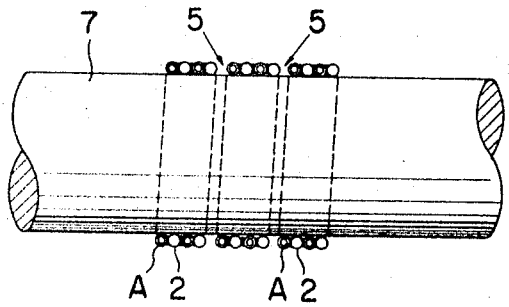

In FIG. 1, there is shown an example of a known composite winding wire made up of two conductor wires A and B with respective insulations 1, 1 which are bonded closely together in parallel arrangement. The wires A and B may, for example, be respectively used as primary and secondary winding wires. An organization of this character, as mentioned hereinbefore, is disadvantageous in that the mutual capacitance between the primary and secondary conductors A and B tends to be high because of the close proximity of these conductors to each other.

The present invention, in one aspect thereof, contemplates overcoming the above-mentioned disadvantage by interposing spacer filaments of insulating material having good high-frequency characteristics between conductor wires coated with respective insulating films and bonding the entire assembly in a flat, side-by-side arrangement to constitute a composite winding wire.

In one example of such a composite winding wire as illustrated in FIG. 2, a spacer filament 2 is interposed between conductor wires A and B with respective insulating film coatings 1, 1, and then the wires A and B and the filament 2 in parallel, side-by-side arrangement are bonded together with an adhesive 3. Similarly, two adjacently positioned spacer filaments 2, 2 can be interposed between insulated conductor wires A and B, as illustrated in FIG. 3. FIG. 4 illustrates still another embodiment of the invention in which spacer filaments 2, 2 are interposed between three insulated conductor wires A, B and C.

For the spacer filament 2 to be used in accordance with the invention an insulating material such as, for example, a polyester filament, exhibiting low high-frequency loss is, of course, desirable. Moreover, a material which melts readily during soldering for purposes such as connecting of the conductor wires to terminals is suitable. Furthermore, while an adhesive is ordinarily used to bond together the conductor wires and spacer filaments, it is also possible to accomplish this bonding by heat bonding or melt bonding.

Thus, by the above described organization of the composite winding wire according to the invention, conductor wires A, B, C, etc., are uniformly spaced apart at constant intervals by spacer filaments 2 interposed between the conductor wires. As a result, the mutual capacitances between the conductor wires are substantially reduced, and at the same time, moreover, deviations in the mutual capacitances between the conductors can be reduced similarly as in known composite winding wires in which insulated conductor wires are bonded directly together.

In the case of known composite wires, the mutual capacitances between the conductor wires increase as a natural result when the diameter of the conductor wires is increased. In contrast, an advantageous feature of the composite winding wire of the present invention is that, when the conductor wire diameter is increased, the mutual capacitances between the conductor wires can be prevented from changing by using spacer filaments of correspondingly increased diameter.

From results of experiments we have found that, in the case of conductor wires of a diameter of 0.18 mm., the capacitance between the conductors is 6.7 pf./10 cm. in a composite winding wire of known type, whereas it is only 2.4 pf./10 cm. in a composite winding wire of the organization shown in FIG. 2 according to the invention.

In the case where a composite winding wire as described above is wound in solenoid form around a core, two conductor wires become closely positioned at each boundary between a previously wound lay part and a lay part wound adjacently thereto of the composite wire. Consequently, the mutual capacitance between these parts becomes high, thus resulting in irregularities in the mutual capacitance between the conductor wires.

This difficulty is overcome by the present invention, in another aspect thereof, in the following manner.

As illustrated in FIGS. 5 and 6, two or more conductor wires A, B, etc., each coated with insulating film 1, are aligned parallelly in a row alternately with the same number of spacer filaments 2, 2, . . ., and the entire assembly is integrally bonded as described hereinbefore. FIG. 5 illustrates the case of two conductor wires A and B and two spacer filaments 2, 2, while FIG. 6 illustrates the case of three conductor wires A, B, and C and three spacer filaments 2, 2, 2, the assemblies being integrally bonded with an adhesive 3.

By thus aligning the same number of conductor wires A B, . . . and spacer filaments 2, 2, . . . parallelly and alternately in a row, a spacer 2 is positioned on the far right side (as viewed in FIGS. 5 and 6) when, for example, a conductor A is positioned on the far left side. Accordingly, when this composite winding wire is wound in a solenoid form around a core as indicated in FIG. 7 or FIG. 8, a conductor wire will always be adjacent to a spacer filament at each of the boundaries 5 between adjacent lays of the winding. (While gaps are shown at the boundaries 5 for clarity, the lays in actual practice are wound without the gaps therebetween.) Thus, there is no possibility of two conductor wires being adjacently positioned.

FIG. 7 illustrates the case where a composite winding wire as described above and as shown in FIG. 5 is wound around a toroidal core 6, while FIG. 8 illustrates the case where a similar composite winding wire is wound around a cylindrical or round-bar bobbin 7 (of a magnetic material or a non-magnetic material).

Thus, by the above described arrangement of conductor wires and spacers in a composite wire for winding in a solenoid form, the mutual capacitance between the conductor wires can not only be reduced but also be made constant.

The present invention, in a further aspect thereof, provides composite winding comprising three or more conductor wires disposed parallely at equal intervals around a common spacer member and bonded thereto. A composite winding of this character is highly suitable for use in pulse transformers having three or more windings.

Figure 9:
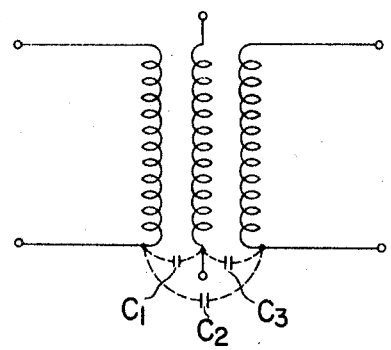
FIG. 9 is a wiring diagram of a pulse transformer.

In a transformer of this type with three windings as illustrated in FIG. 9, it is required that the mutual capacitances between the windings as designated by $C_1$, $C_2$, $C_3$, . . . and the leakage inductances be uniform and that, moreover, the mutual capacitances be reduced as much as possible. These requirements are fully met by the composite winding wires of the invention as described below.

Figure 10:
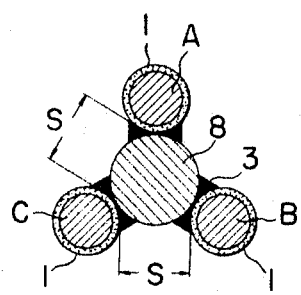
FIGS. 10 and 11 are enlarged cross-sectional views respectively showing further examples of composite winding wires according to the invention.
Figure 11:
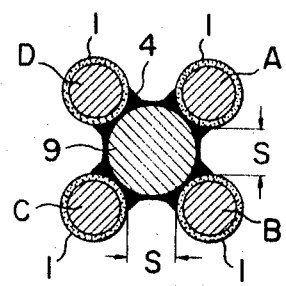

FIGS. 10 and 11 respectively illustrate examples of three conductor wires A, B, and C and four conductor wires, A, B, C, and D, each coated with an insulating film 1 disposed at equal intervals with a space S therebetween around single spacer members 8 and 9 made of an insulating material the conductor wires being bonded to their respective single spacer members with adhesive 3. As mentioned hereinbefore, the conductor wires with their respective insulating films 1 may be secured to the spacer member also by melt bonding.

In these cases, also, the spacer members 8 and 9 are made of a material such as polyesters resin or nylon of low high-frequency loss, and the conductor wires are coated with insulating films made of a resin permitting the ends of the windings to be easily separated and assuming an insulative state when the winding ends are thus separated.

The above described organization of the composite winding wires according to the invention affords the following advantageous features. Since the conductor wires are fixed at positions on the spacer member with equal spaces S therebetween, deviations in the mutual capacitances between the windings are eliminated, and, moreover, the leakage inductances are also caused to be uniform. Furthermore, as indicated in FIGS. 10 and 11, a large space S is afforded, whereby the mutual capacitances between the conductor wires are substantially reduced. We have found that these mutual capacitances are not affected appreciably by the thickness of the insulating films 1.

Another feature of the above described composite wire is that, similarly as in the example of composite wires described hereinbefore with reference to FIGS. 2 through 6, when conductor wires of large diameter are used, the mutual capacitances can be prevented from becoming high by increasing accordingly the central spacer member.

It will be obvious that the conductor wires used in fabricating the composite winding wires according to the invention may be coated with insulating films of respectively different colors to facilitate identification.

It should be understood, of course, that the foregoing disclosure relates to only preferred embodiments of the invention and that it is intended to cover all changes and modifications of the examples of hte invention herein chosen for the purposes of the disclosure, which do not constitute departures from the spirit and scope of the invention as set forth in the appended claims.

We claim:

1. A composite winding for transformers, which comprises a plurality of parallelly disposed electrical conductor wires each coated with an electrically insulating film and at least one spacer filament made of an electrically insulating material, having a transverse dimension corresponding to that of the wires, and having good high-frequency characteristics, and bonded to the insulating films of the conductor wires in interposed, side-by-side relation thereto to form an integral, flat structure constituting a composite winding wire in which the conductor wires are maintained mutually parallel and spaced apart by said spacer filament.

2. A composite winding for transformers, which comprises a plurality of electrical conductor wires each coated with an electrically insulating film and the same number of spacer filaments of an electrically insulating material of good high-frequency characteristics, the conductor wires and spacer filaments being disposed alternately and parallelly in a single row and thus bonded together to form an integral structure.

3. A composite winding for transformers, which comprises a single spacer filament and at least three electrical conductor wires each coated with an electrically insulating film and disposed. parallely with equal space intervals therebetween around the periphery of the spacer filament, the insulating films of the conductors thus disposed being bonded to the spacer filament to form an integral structure.

4. A composite winding for transformers, which comprises
   a pair of electrical conductor wires disposed in spaced parallel relationship, and respectively covered with electrically insulating material;
   an intermediate spacer element of electrically insulating material disposed longitudinally between and parallel to said conductor wires and characterized by a transverse dimension substantially the same as the conductor wires, and by a low loss constant at high frequency;
   and cementing means disposed between the intermediate spacer means and said two wires, and bonded to the insulation covering material on said wires, to hold said two wires and spacer in related planar arrangement longitudinally, to constitute an integral composite winding wire in which the conductor wires are maintained mutually parallel and regularly spaced apart.

References Cited

UNITED STATES PATENTS

| | | |
|---|---|---|
| 644,312 | 2/1900 | Anderson _____ 336—206 |
| 2,064,513 | 12/1936 | Andrews. |
| 2,848,794 | 8/1958 | Roth. |
| 3,364,305 | 1/1968 | Hanlon _____ 174—113 X |

ELLIOTT A. GOLDBERG, Primary Examiner

U.S. Cl. X.R.

174—113; 336—206, 207, 220, 222